United States Patent [19]
Gueret

[11] Patent Number: 5,271,432
[45] Date of Patent: Dec. 21, 1993

[54] ADJUSTABLE VALVE AND DISPENSER PROVIDED WITH A VALVE OF THIS KIND

[75] Inventor: Jean-Louis H. Gueret, Paris, France

[73] Assignee: L'Oreal, Paris, France

[21] Appl. No.: 912,192

[22] Filed: Jul. 13, 1992

[30] Foreign Application Priority Data

Jul. 25, 1991 [FR] France ............................. 91 09419

[51] Int. Cl.$^5$ ............................................. F16K 15/14
[52] U.S. Cl. ................................. 137/854; 137/855;
222/207; 222/494
[58] Field of Search ............... 222/207, 494; 137/854, 137/855

[56] References Cited

U.S. PATENT DOCUMENTS

| | | | |
|---|---|---|---|
| 3,160,329 | 12/1964 | Radic | 222/207 X |
| 3,297,048 | 1/1967 | Imhof | 137/854 X |
| 3,610,698 | 10/1971 | Gachot | 137/856 X |
| 4,550,749 | 11/1985 | Krikorian | 137/854 X |
| 4,867,740 | 9/1989 | East | 137/854 X |

FOREIGN PATENT DOCUMENTS 2025940 12/1971 Fed. Rep. of Germany ...... 137/854

OTHER PUBLICATIONS

English summary FR 70076 Feb. 1959.
English summary FR 931126 Feb. 1948.
English summary FR 2373740 Jul. 1978.

*Primary Examiner*—Robert G. Nilson
*Attorney, Agent, or Firm*—Cushman, Darby & Cushman

[57] ABSTRACT

One-way valve having a flap (4) formed by a partially elastic element comprising, on the one hand, a rigid part (5) fixed by a hooking means (6) to a container (1) containing a viscous product (2) and, on the other hand, an elastic part (8) bearing elastically against a sealing zone (9) integral with the container, the said valve having adjusting means (11, 12) for adjusting the bearing force of the said elastic part on the said sealing zone, the said adjusting means also forming the said hooking means.

16 Claims, 3 Drawing Sheets

ADJUSTABLE VALVE AND DISPENSER PROVIDED WITH A VALVE OF THIS KIND

BACKGROUND OF THE INVENTION

1. Field of the Invention

The invention relates to a one-way valve for delivering a viscous product from a container or retaining it in said container.

2. Description of the Prior Art

A valve of the abovementioned type has already been proposed, e.g. in FR-A-2 373 740, said valve having a partially elastic element serving as a flap, which, on the one hand, in its rigid part, is fixed to the container by a hooking means, and, on the other hand, in its elastic part, bears elastically against a sealing zone integral with the container. A valve of this kind is used in particular to prevent any secondary air in flexible tubes containing pasty or viscous products, such as toothpastes. It is known that tubes of this type usually consist of a tubular body of generally circular or elliptical section. One end of the said tubular body is closed after filling of the tube by flattening and welding. At the other end, a head or connector forming the neck of the container is connected to the tubular body.

When a certain quantity of the product is expelled from an elastic tube that can be flattened, the tube, by virtue of its elasticity, tends to resume its initial shape when the expulsion pressure ceases and in so doing tends to draw in air in place of the expelled product. This forms a disadvantage for some types of product for which the presence of air before they are expelled has a detrimental effect. The presence of air, particularly finely divided air, in some toothpastes can cause the separation of liquid and solid phases or drying-out of the paste. Moreover, the presence of air can cause oxidation of certain flavouring oils used in toothpastes. In the case of perfumed creams, the presence of air can cause oxidation of some of the compounds forming the perfumes.

A valve of this kind is described in the aforesaid document FR-A-2 373 740. However, the latter only displays advantageous operation to the extent that the pressure exerted by the elastic part is strong enough to drive back the viscous product when the expulsion pressure ceases, meaning that each valve must be adapted to the viscosity of the product.

SUMMARY OF THE INVENTION

The aim of this invention is to obtain an inexpensive valve that can be used for any product irrespective of its viscosity.

This invention relates to a one-way valve having a flap formed by a partially elastic element comprising, on the one hand, a rigid part fixed by a hooking means to a container containing a viscous product and, on the other hand, an elastic part bearing elastically against a sealing zone integral with the container, characterised in that the said valve has adjusting means for adjusting the bearing force of the said elastic part on the said sealing zone, the said adjusting means also forming the said hooking means.

In this manner, the same valve can be used for products of different viscosities using economical means.

In a preferred embodiment, the adjustment of the bearing force of the elastic part of the flap on the sealing zone is effected at the instant its rigid part is hooked on to the container by positioning and fixing the said rigid part at a greater or lesser distance from the median plane of the sealing zone in a direction substantially perpendicular to the said median plane. Adjustment is therefore effected in the most economical manner possible by proceeding to assembly with the force required for the desired depression.

There are various possible embodiments of the hooking means for the rigid part.

The adjusting and hooking means advantageously consist of a snap-in locking device. The snap-in locking device consists in particular of two complementary elements, one forming a rack, while the other has a single tooth cooperating with the toothing of the rack.

According to one embodiment, the rigid part of the flap forms a chamber into the interior of which there projects an annular flange forming the single tooth of one of the elements of the snap-in locking device, the rack forming the other element being formed on the periphery of a finger which penetrates into the said chamber and is integral with the container.

As a variant, the said adjusting and hooking means consist of a male element and a female element cooperating by snap engagement, the said engagement of the male element into the female element being effected to a greater or lesser extent according to the desired adjustment.

It will be noted that after assembly, e.g. as the container is used, it can be envisaged to modify the adjustment by depressing the flap to a greater or lesser extent in order to increase the bearing force as a function of the viscosity of the product to be dispensed.

In another embodiment, the positioning of the rigid part is effected automatically during operation. The rigid part of the flap forms a chamber into the interior of which there projects an annular flange, a finger integral with the container penetrating into the chamber and being provided with a head adapted to cooperate with the said annular flange to form a stop.

According to some variants, the sealing zone is a substantially flat ring surrounding the adjusting and hooking means, the elastic part of the flap being in the form of a truncated membrane, the large base of which bears against the said sealing zone.

According to one embodiment, the sealing zone consists of a transverse plate provided on the neck forming part of a support having a cylindrical skirt snapped on to the end of a rigid casing. The support is closed by a wall covered by a flexible membrane having, on the one hand, a nose bearing in a sealed manner against a seat provided on the support, and, on the other hand, a central portion in the shape of a spherical dome traversing an opening having in its centre a retaining cap for the membrane integral with the support.

It is also possible for the sealing zone to be a ring having a substantially flat median line, the adjusting and hooking means being situated to the exterior of said ring, the elastic part of the flap being in the form of a tongue, the edges of which bear against the sealing zone.

The said partially elastic element advantageously consists of a single piece moulded from an elastomeric material having a Shore hardness number of 15 to 80 A, for which it is known that it is possible to vary its rigidity and/or elasticity as a function of its shape and thickness.

This invention also relates to a viscous product dispenser provided with a one-way valve of this kind.

BRIEF DESCRIPTION OF THE DRAWINGS

This in will be more readily understood from the description of three embodiments given purely by way of nonlimiting examples and illustrated in the accompanying drawings, in which.

DETAILED DESCRIPTION OF THE INVENTION

Figure 1:
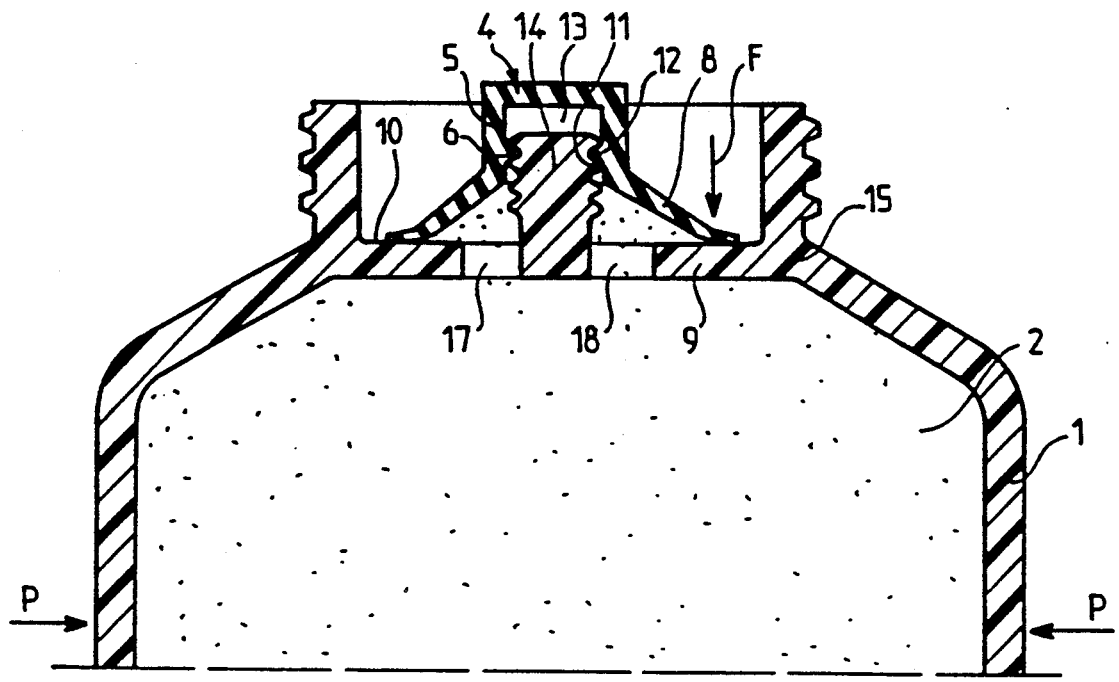
FIG. 1 is an axial section of a flexible dispensing container provided with a valve according to a first variant embodiment of the invention.

Referring to the drawing, it will be seen that FIG. 1 shows a section of a tube 1 filled with a viscous product 2 and provided with a neck 15 associated with a partially elastic element designated in general by the reference numeral 4 in order to form a one-way valve.

The element 4 forms a flap. This flap has, on the one hand, a rigid part 5 and a hooking means 6 for hooking on to the neck 15 and, on the other hand, an elastic part 8, in this case in the form of a truncated flexible membrane which bears with a force F against the sealing zone 9 of the plate 10 of the neck. The rigid part 5 is a hollow cylinder closed at one end and defining a chamber 13. An annular flange 12 is provided on the inner face of the cylinder 5, at the side opposite its closed end.

The neck 15 is provided with a plate 10 perpendicular to the axis of the tube, the said plate having openings 17, 18 of sufficient number and dimensions to allow for the passage of the product 2 while the membrane 8 prevents delivery of the product 2.

When a pressure P is exerted on the walls of the bottle 1, as soon as the said pressure applied to the product 2 is sufficient the latter drives back the membrane 8 in order to emerge from the tube along the sealing zone 9. Conversely, the membrane 8 serves as a non-return valve as soon as the pressure is released.

The hooking means 6 is in this case obtained by a snap-in locking device consisting of a rack 11 cooperating with a single tooth. The rack 11 is formed on the periphery of a finger 14 integral with the plate of the neck 15 and disposed in the interior of the chamber 13. The single tooth is formed by the annular flange 12 which projects into the interior of the chamber 13.

The flap 4 rises substantially perpendicularly to the plate 10 and the adjustment of the bearing force F is effected by positioning and fixing the said rigid part 5 at a greater or lesser distance from the plate 10. It is clear that the further the flap 4 is depressed, the greater the force F and the greater the pressure P required for delivery of the product 2. In this manner, the same element 4 can be used irrespective of the viscosity of the product, as, now, the force required for operation of the valve is adjustable at the time of assembly by depressing the partially elastic element 4 to a greater or lesser extent.

In this embodiment, the valve is symmetrical about the axis of the tube 1, and the sealing zone 9 has an annular shape opposite the flexible end of the membrane 8.

Figures 2, 3:
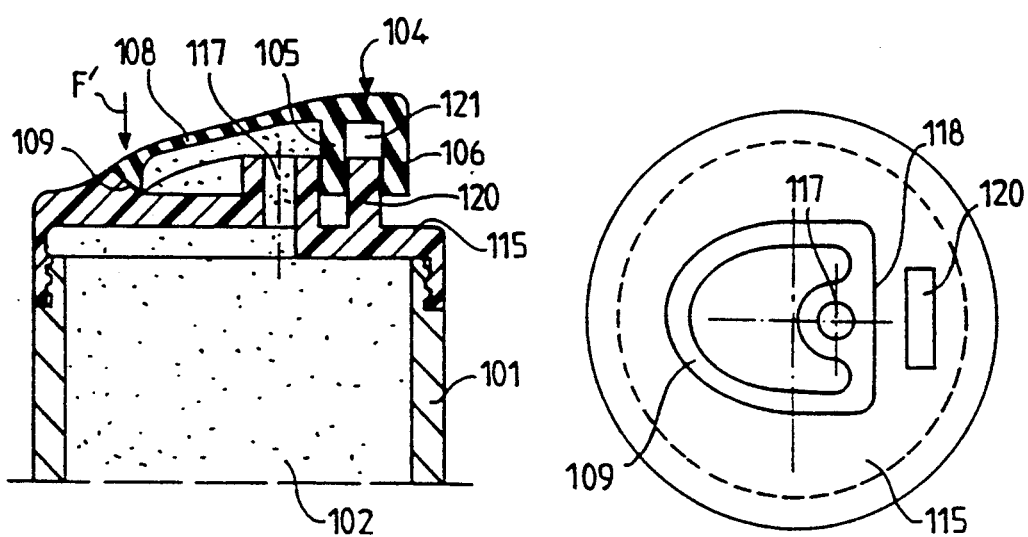
FIGS. 2 and 3 are a section and a top view respectively of a valve according to a second variant embodiment of the invention, the flap being removed in FIG. 3.

FIGS. 2 and 3, on the other hand, show an embodiment of an eccentric valve.

A partially elastic element designated in general by the reference numeral 104 forms a flap. This flap has a rigid part 105 which can engage to a greater or lesser extent a parallellepipedal projection 120 of appropriate shape provided on a connector forming the neck 115 of a tube 101.

A flexible part in the form of a tongue 108 of the element 104 comes to bear with a force F' against a sealing zone 109. At least one opening 117 is provided in the neck 115, so that, in a similar manner to FIG. 1, the tongue 108 serves as a non-return valve for the viscous product 102.

The adjusting and hooking means in this case consist of a male element formed by the projection 120 provided on the neck 115 and by a female element 121 provided in the rigid part 105 of the flap 104. The inverse is of course also possible.

The male and female parts which together form the hooking means 106 are force fitted on to one another. They are situated to the exterior of the sealing zone 109 which is very clear in FIG. 3 as a result of the fact that the flap 104 is not shown there. The flap 104 is fixed at the time of assembly in a direction substantially parallel to the axis of the opening 117, by depressing it to a greater or lesser extent with respect to the median plane of the sealing zone 109, in a direction substantially perpendicular to the said median plane. The male element 120 is rectangular in plan view. The part of the flap 104 inserted by force between the projection 120 and the wall 118 opposite which partially defines the opening 117 of the neck is sufficiently forced to assist with sealing of the valve.

It is clear that in this second variant embodiment of the invention, and as in the case of the first variant, the valve is also adjustable as a function of the greater or lesser depression of the force fitting system.

FIGS. 4 to 7 show another embodiment of the one-way valve according to this invention.

Figure 4:
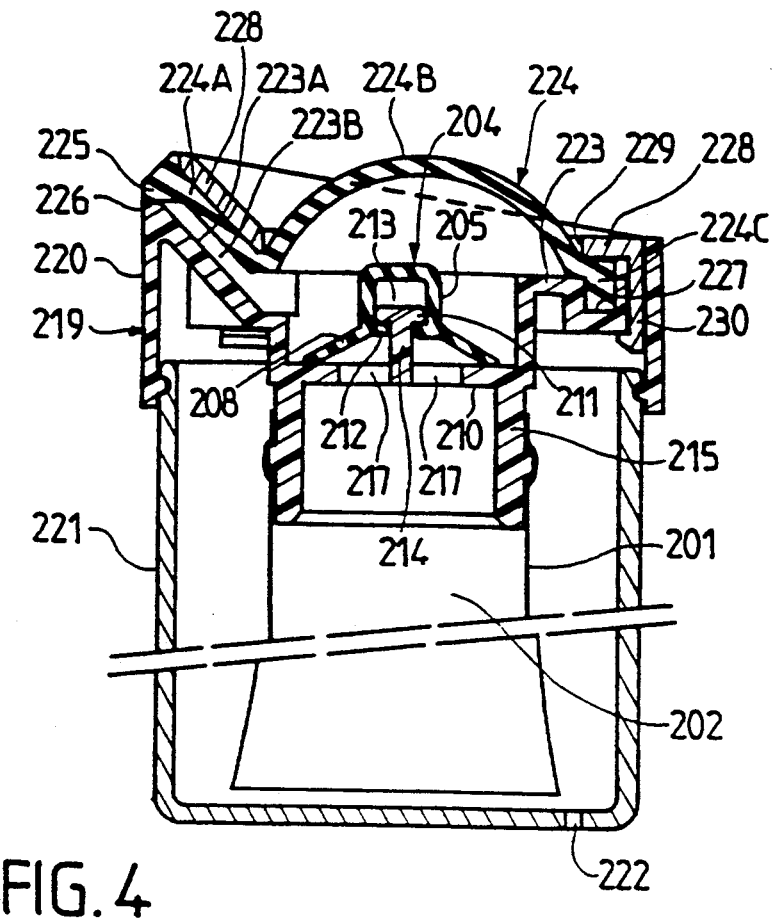
FIGS. 4 and 5 are partial sections of a flexible dispensing pouch provided with a valve according to a third variant embodiment of the invention, the valve being shown in two respective operating positions.

According to FIG. 4, a container formed by a flexible pouch 201 filled with a product 202 is fitted on to a neck 215 of circular section with which the neck 215 forming part of a support 219 having a cylindrical skirt 220 of circular section snapped on to the end of a rigid casing 221 also of circular section is made integral in a sealed manner, e.g. by gluing. An air inlet 222 is provided in the bottom of the casing 221.

The support 219 is closed in its upper part between the skirt 220 and the neck 215 by a wall 223, one part 223A of which is inclined with respect to the axis of the casing 221 and the neck 215 from its junction with the skirt 220 and towards the neck 215 and extends over a small width perpendicularly to the plane of FIG. 4, being bordered by flanks 223B, the edges of which are parallel to the part 223A.

A flexible membrane 224 covers the wall 223 of the support 219. At right angles to the part 223A and the flanks 223B of the wall 223, the membrane 224 has a portion 224A having a shape complementary to that of the part 223A and the flanks 223B, which ends in a nose 225 bearing in a sealed manner against a seat 226 formed by the end edge of the channel formed by the part 223A and the flanks 223B. The said channel is covered by the portion 224A of the membrane 224 which moreover has a central portion 224B in the shape of a spherical dome and a semi-circular anchoring projection 224C as a continuation of the wings 231 and 232 which border the portion 224A overlapping the flanks 223B of the wall 223 and which can be seen in FIG. 7 which shows the membrane 224 alone in perspective. The projection 224C and the wings 231 and 232 are disposed in a groove 227 formed in the wall 233 shown more clearly in FIG. 6 which shows a perspective view of the support 219 on which only the element 204 is mounted. Parallel to the flanks 223B, axial walls 233 and 234 flank the wings 231 and 232 of the membrane 224 when the latter is mounted in the support 219. A cap 228 of plastic material is provided in its centre with an opening 229 for the passage of the dome 224B and covers the remainder of the membrane 224, holding the portions 224A and the nose 225, on the one hand, and the projection 224C, on the other hand, against the wall 223. The cap 228 is made integral with the wall 223 by clipping fingers 230 traversing holes formed to this end in the wall 223.

The neck 215 is associated with a partially elastic element designated in general by the reference numeral 204 in order to form a one-way valve.

The element 204 has, on the one hand, a rigid part 205 and, on the other hand, an elastic part 208 in the form of a truncated flexible membrane. The neck 215 is provided with a transverse plate 210 which has openings 217 of sufficient number and dimensions to allow for the passage of the product 202. The channel formed by the part 223A and the flanks 223B leads to the neck 215 above the said plate 210.

Figure 5:
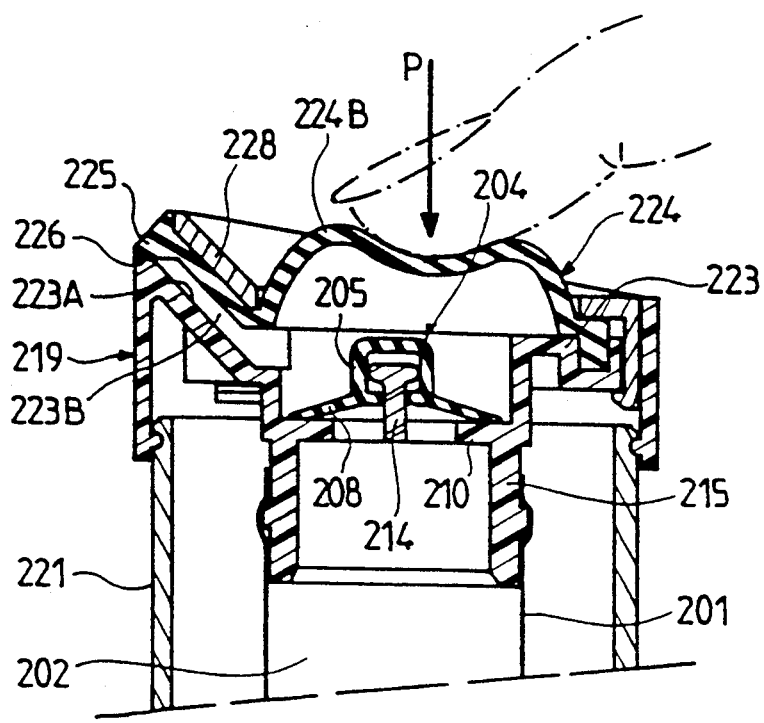
Figure 6:
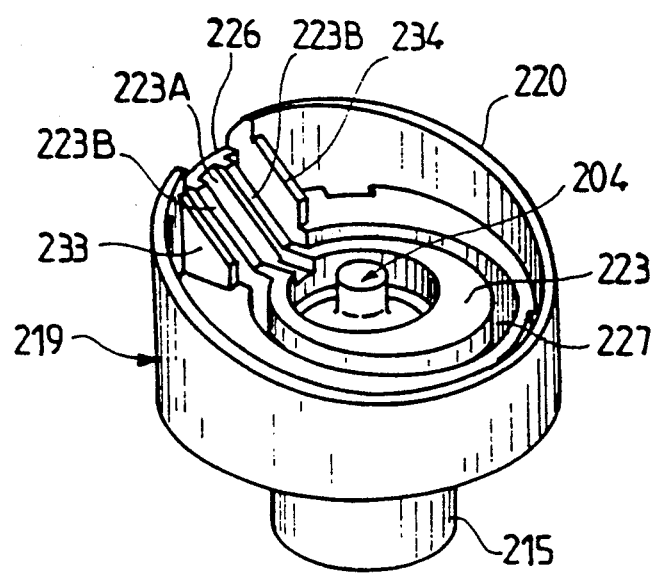
FIGS. 6 and 7 are perspectives on different scales of elementary components used in the variant of FIGS. 4 and 5.
Figure 7:
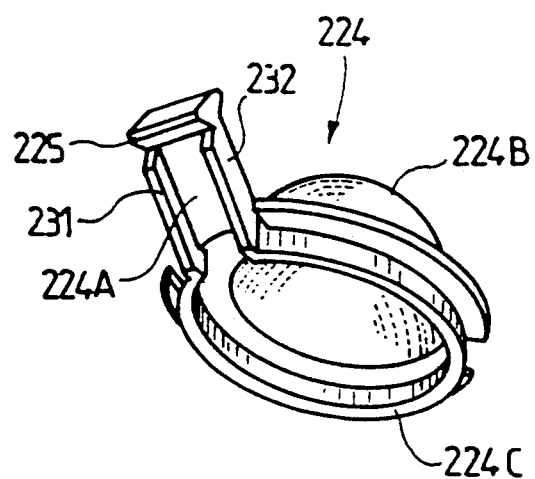

The rigid part 205 of the element 204 is a hollow cylinder closed at one end and defining a chamber 213. An annular flange 212 is provided on the inner face of the chamber 213 at the side opposite its closed end. A finger 214 is integral with the plate 210 of the neck 215, the chamber 213 covering the finger 214 which is provided with a circular head 211 which holds the element 204 by cooperation with the annular flange 212. In the rest position shown in FIG. 4, the elastic part 208 of the element 204 bears against the sealing zone of the plate 210 defined around the openings 217, the annular flange 212 bearing against the head 211. In this manner, in this position, an initial bearing force of the elastic part 208 on the sealing zone 208 is ensured at rest. The value of this bearing force then depends on the relative positions of the rigid part 205 and the head 211. The further the head 211 penetrates into the chamber 213, the greater the bearing force. FIG. 5 shows different relative positions of this kind from those corresponding to the rest position shown in FIG. 4. It will be seen in FIG. 5 that sealing is effected by the elastic part over a greater diameter than that corresponding to FIG. 4.

The operation is as follows. At rest, after use, the product 202 fills, on the one hand, the volume of the neck 215 under the element 204 and the flexible pouch 201 and, on the other hand, the volume defined above the element 204 by the wall 223 and the membrane 224. When a pressure P is exerted on the dome 224B of the membrane 224 as illustrated in FIG. 5, the pressure in the volume situated above the element 204 increases. As a result of this pressure, the rigid part 205 of the element 204 descends the length of the finger 214 and the flexible membrane 208 spreads out on the plate 210, thereby further perfecting the seal. When the pressure in the said volume reaches a sufficient value, it raises the nose 225 from its seat 226 and the product can escape towards the exterior. When pressure ceases to be exerted on the dome 224B, the nose 225 returns to rest on its seat 226, insulating the product from the exterior. During the return movement of the dome 224B towards it rest position, firstly, the rigid part 205 rises the length of the finger 214 until the flange 212 comes to a stop against the head 211, the flexible membrane 208 resuming its contact of smaller diameter with the plate 210, then being raised in order to allow for the passage of the product 202 from the pouch 201 towards the volume above the element 204, and until the dome 224B resumes its rest position by elasticity. The pouch 201 follows this transfer of product 202 without stress as a result of the air inlet 222 provided in the bottom of the casing 221.

As seen, when pressure is exerted on the dome 224B, the sealing of the membrane 208 is increased. This is advantageous when the product is not very viscous, the risk of leakage being considerably reduced. Upon release of the pressure on the dome, the resistance to the passage of the product from the pouch 201 towards the volume situated above the element 204 is reduced. This is advantageous when the product is very viscous. In this manner, by virtue of the invention, the same element 204 allows for efficient operation of the valve irrespective of the viscosity of the product.

I claim:

1. A one-way valve having a flap formed by a partially elastic element comprising a rigid part fixed by a hooking means to a container containing a viscous product and an elastic part bearing elastically against a sealing zone provided on the container, said valve having adjusting means for adjusting the bearing force of said elastic part on said sealing zone, said adjusting means also comprising said hooking means, said sealing zone surrounding an opening for discharge of the product from the container, said elastic part being positioned over said opening so as to be movable away from said opening and said sealing zone by contact with the product when pressure is applied to the product in the container and moved back toward said sealing zone when the pressure on the product in the container is diminished, the bearing force of said elastic part being adjusted according to the viscosity of the product so as to push any of the product disposed between said opening and said elastic part back into the container.

2. Valve according to claim 1 characterised in that the sealing zone (9, 210) is a substantially flat ring surrounding the adjusting and hooking means, the elastic part (8, 208) of the flap (4, 204) being in the form of a truncated membrane, the large base of which bears against the said sealing zone (9, 210).

3. Valve according to claim 1 characterised in that the partially elastic element (4, 104, 204) consists of a single piece moulded from an elastomeric material having a Shore hardness number of 15 to 80 A.

4. The valve as claimed in claim 1 wherein the force with which said elastic part of said flap bears on said sealing zone is adjustable, said sealing zone having a median plane and said adjustment being effected by positioning said rigid part at a selected distance from said median plane of said sealing zone in a direction substantially perpendicular to said median plane.

5. Valve according to claim 4, characterized in that the positioning of the rigid part (5, 105) is effected by fixing the said rigid part (5, 105) at the instant it is hooked on to the container.

6. Valve according to claim 5, characterised in that the said adjusting and hooking means consist of a snap-on locking device (11, 12).

7. Valve according to claim 6, characterised in that the snap-in locking device consists of two complementary elements, one forming a rack (11), while the other has a single tooth (12) cooperating with the toothing of the rack.

8. Valve according to claim 7, characterised in that the rigid part of the flap forms a chamber (13) into the interior of which there projects an annular flange (12) forming the single tooth of one of the elements of the snap-in locking device, the rack (11) forming the other element being formed on the periphery of a finger (14) which penetrates into the said chamber and is integral with the container (1).

9. Valve according to claim 5 characterised in that the adjusting and hooking means comprises a male element (120) and a female element (121) cooperating by snap engagement, the said engagement of the male element into the female element being effected to a distance corresponding to the desired of adjustment.

10. Valve according to claim 9 characterised in that the sealing zone (109) is a ring having a substantially flat median line, the adjusting and hooking means (120, 121) being situated to the exterior of said ring, the elastic part of the flap being in the form of a tongue (108), the edges of which bear against the sealing zone (109).

11. Valve according to claim 4, characterised in that the positioning of the rigid part (205) is effected automatically during operation.

12. A one-way valve having a flap formed by a partially elastic element comprising a rigid part fixed by a hooking means to a container containing a viscous product and an elastic part bearing elastically against a sealing zone provided on the container, said valve having adjusting means for adjusting the bearing force of said elastic part on said sealing zone, said adjusting means also comprising said hooking means, said adjusting means comprising an enclosure at least partially enclosing said hooking means and being movable on said hooking means to effect said adjustment of the bearing force, said sealing zone surrounding an opening for discharge of the product from the container, said elastic part being positioned over said opening so as to be movable away from said opening and said sealing zone by contact with the product when pressure is applied to the product in the container and moved back toward said sealing zone when the pressure on the product in the container is diminished, the bearing force of said elastic part being adjusted according to the viscosity of the product so as to push any of the product disposed between said opening and said elastic part back into the container.

13. Valve according to claim 12, characterised in that the sealing zone (210) consists of a transverse plate (210) provided on the neck (215) forming part of a support (219) having a cylindrical skirt (220) snapped on to the end of a rigid casing (221).

14. Valve according to claim 13, characterised in that the support (219) is closed by a wall (223) covered by a flexible membrane (224) having, on the one hand, a nose (225) bearing in a sealed manner against a seat (226) provided on the support (219), and, on the other hand, a central portion in the shape of a spherical dome (224B) traversing an opening (229) having in its centre a retaining cap (228) for the membrane integral (224) with the support (219).

15. The invention as claimed in claim 12 wherein said one-way valve is disposed in a chamber mounted on the container, said chamber having a pressure actuated valve and a flexible wall portion so that a user, upon applying pressure to said wall portion will effect opening of said pressure actuated valve, said adjustment means of said one-way valve being moved to increase the bearing pressure in response to application of pressure to said wall portion.

16. A one-way valve having a flap formed by a partially elastic element comprising a rigid part fixed by a hooking means to a container containing a viscous product and an elastic part bearing elastically against the sealing zone integral with the container, characterized in that said valve has adjusting means for adjusting the bearing force of said elastic part on said sealing zone, said adjusting means also forming said hooking means, wherein the force with which said elastic part of said flap bears on said sealing zone is adjustable, said sealing zone having a median plane and said adjustment being effected by positioning said rigid part at a selected distance from said median plane of said sealing zone in a direction substantially perpendicular to said median plane, said positioning of said rigid part being effected automatically during operation, said rigid part of said flap forming a chamber into the interior of which their projects an annular flange, a finger integral with the container penetrating into said chamber and being provided with a head adapted to cooperate with said annular flange to form a stop.

* * * * *